United States Patent Office 2,937,837
Patented May 24, 1960

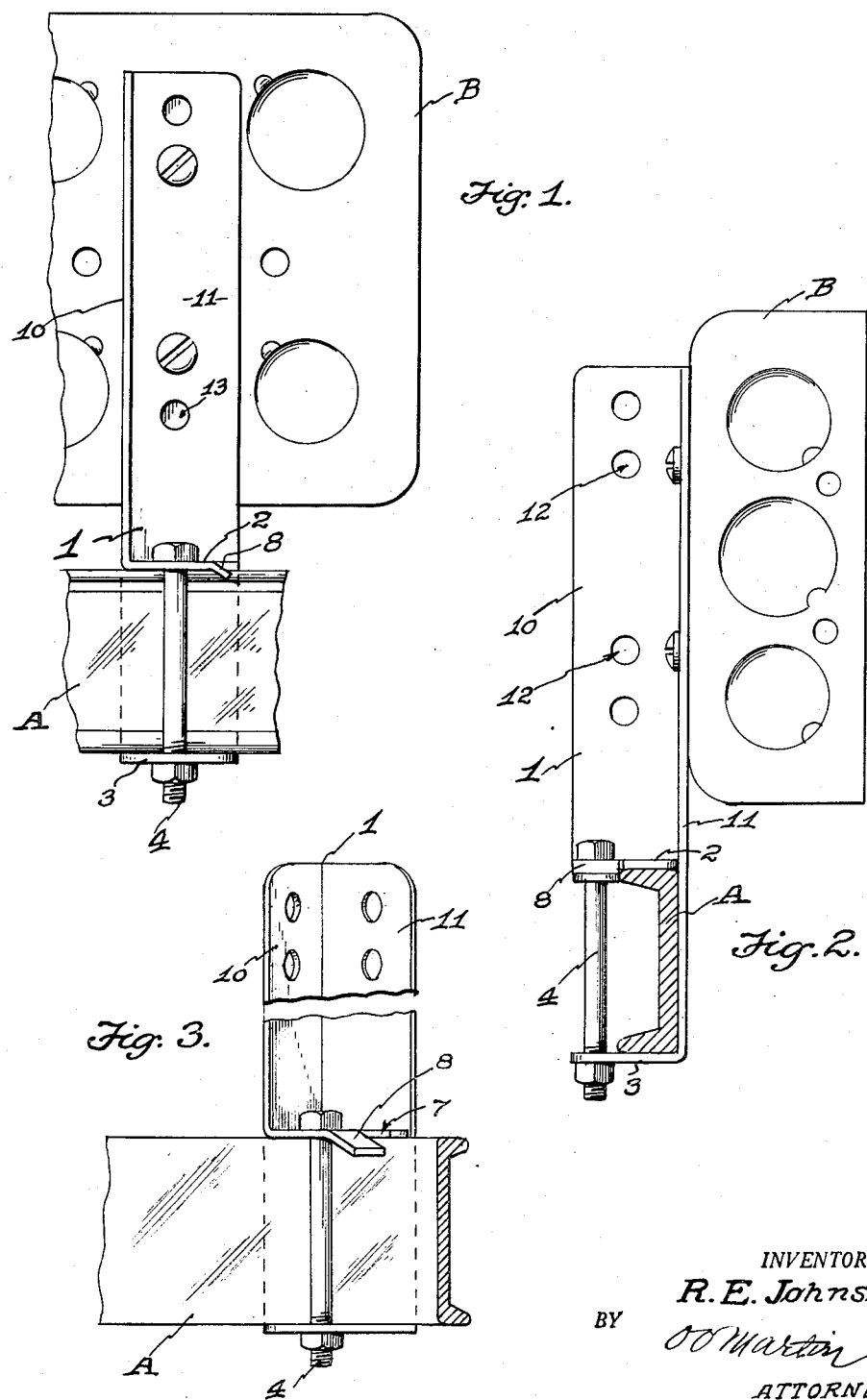

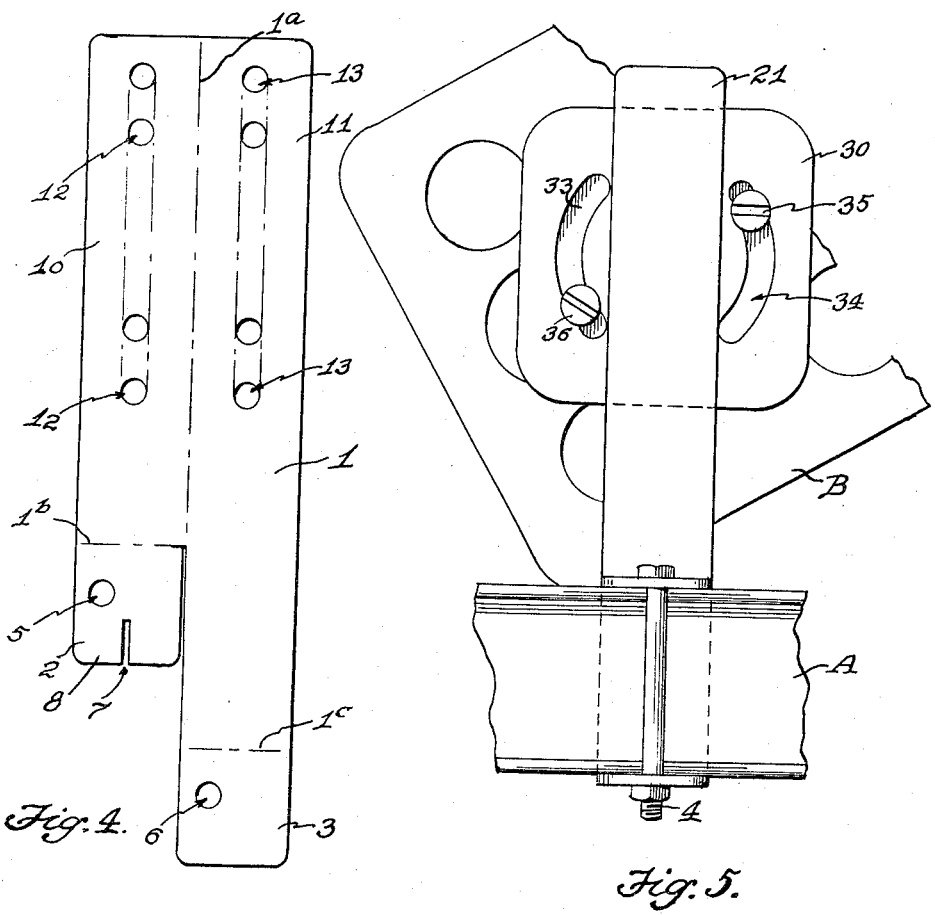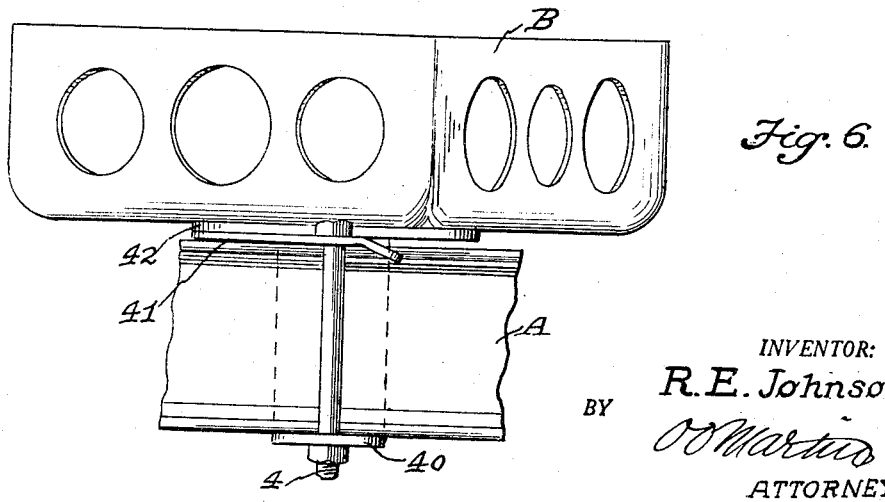

2,937,837
OUTLET BOX SUPPORT BRACKET

Richard E. Johnson, Glendale, Calif., assignor to Steel City Electric Company, Pittsburgh, Pa., a corporation of Pennsylvania Filed June 25, 1957, Ser. No. 667,902

4 Claims. (Cl. 248—228)

This invention relates to supports for outlet boxes and has particular reference to supports for such boxes mounted on furring channels suspended from overhead beams of fireproof building structures.

It is the object of the present invention to provide a device of the type referred to on which outlet boxes may be placed in the most convenient conduit receiving position. A further object is to provide an outlet box support on which the box may be swung vertically as well as horizontally into the most convenient conduit receiving position.

These as well as other objects of the invention and the many advantageous features thereof will be apparent from the following detailed description and by referring to the accompanying drawings in which a preferred form of the invention is illustrated.

In the drawings:

Fig. 1 is a front elevational view of the outlet box support of the invention mounted in position on the flat side surface of a furring channel beam;

Fig. 2 is a substantially corresponding view taken at right angles to Fig. 1;

Fig. 3 shows, in perspective, the outlet box support reversed on the channel to seat against the edges of the channel flanges;

Fig. 4 is a front elevational view of the blank out of which the outlet box support is formed;

Fig. 5 illustrates the manner in which a plate may be added to support the outlet box in various intermediate positions on the support; and Fig. 6 shows how the box support may be somewhat modified to maintain the box in entirely different positions on the channel beam.

In buildings of fire proof construction it is customary to suspend the ceilings from overhead beams by means of a number of furring channels, such as indicated at A in the drawings, to support outlet boxes B or other devices. A bracket 1 is for this purpose shown mounted on the channel beam to rise vertically therefrom and it is clamped in position thereon in the following manner.

The support bracket is, as illustrated in Fig. 4, formed from a blank of sheet metal of the proper strength and resilience. The material of the blank is bent at right angles on lines 1ª, 1ᵇ, 1ᶜ to provide the flanges 2, 3, forming a U-shaped channel which snugly engages the surfaces of the channel A when the bracket is placed in position thereon. A bolt 4 is then seated in perforations 5, 6 of the U-shaped channel more firmly to clamp the support in position on the furring channel. A notch 7 is cut into the edge of the flange 2 to form a lip 8 which before or after the bracket has been mounted on the furring channel is bent downward to ride against the side edge of the furring channel, as indicated in Figs. 1 and 2, rigidly to lock the bracket against transverse shifting movement on the furring channel.

An outlet box B may now be mounted on either one of the side members 10, 11 of a right angle member of the bracket by means of bolts or screws seated in perforations 12, 13 of the side members. The perforations are spaced apart different distances to suit corresponding perforations of the outlet box to be supported, or, if preferred, elongated perforations may be substituted, as indicated in phantom outline in Fig. 4.

Outlet boxes used in building construction are generally square or hexagonal in outline to receive conduits extending through the space above the channels. But it happens at times that a conduit is directed at an odd angle making it necessary to bend the conduit into correct registration with a conduit opening of the box. This requires additional operations, often difficult to perform within the limited space above the furring channels. Such additional labor may be entirely eliminated by mounting the box for limited circular adjustment on the support bracket.

It is for this purpose merely required somewhat to modify the shape of the support bracket, substantially as illustrated in Fig. 5. The lower end of the bracket may remain unchanged and it extends upward to form a flat backing 21 for a support plate 30 which is rigidly affixed to the backing in any suitable manner as by welding or brazing operations. A pair of arcuate slots 33, 34 are cut through the support plate 30 to receive bolts 35, 36 by means of which the outlet box may be adjustably mounted in position on the plate. And when the slots are made as long as possible, without weakening the plate, it is seen that the box may be swung into many intermediate angular positions to accommodate oddly directed conduits.

It is seen from the foregoing description that I have provided an outlet box support mountable on a furring channel, particularly the furring channel employed in fireproof building construction. It is important to note that the outlet box B may be placed on the furring channel as shown in Fig. 2 or may be mounted on the other side member of the bracket to take a position at right angles to that of Fig. 2. It is also important to note that the bracket may be reversed on the furring channel, as indicated in Fig. 3, to place the box in either one of the two unoccupied positions. In other words, the outlet box may be placed in any one of four rectangularly spaced positions on the furring channel.

But the device of the invention is not limited to these four positions since the bracket may be inverted to extend the side members downwardly from the furring channel without in any way changing or modifying the construction of the device. Four more positions are in this manner obtainable. And merely placing the simple plate 30 on the bracket enables the user to mount the outlet box in a great number of intermediate angular positions relative to the furring channel. All of this well nigh renders the device universal in its adaptation to furring channels of fireproof building structures.

In other cases, it may be found advantageous to place the support bracket horizontally on the furring channel and so to be able to swing the outlet box horizontally on the bracket and furring channel. The lower portion of the bracket may, as illustrated in Fig. 6, remain as shown in Figs. 1 and 2, but the side members 10, 11 are omitted and the upper flange 2 has been horizontally extended to provide a support 41 for a base 42. This base may be exactly like the base 30 and it is secured in position on the support 41 in like manner. The outlet box is then placed on the base and it is angularly adjustable thereon in the manner illustrated in Fig. 5 of the drawings.

I claim:

1. An outlet box support for mounting outlet boxes on a furring channel, said support comprising: a U-shaped channel adapted to fit around the furring channel; a bolt extending across the open side of said U-shaped channel to secure said channel to said furring channel; a right angle member extending from said U-shaped channel; and means to secure an outlet box to either side of said right angle member.

2. An outlet box support as set forth in claim 1 and having a plate secured to one side of said angle member, said plate having arcuate slots to mount the box thereon and to allow angular adjustment of the box with respect to said arms.

3. An outlet box support mountable on a channel beam having a web and flanges extending at right angles from said web, said support comprising: a bracket having side members set at right angles to each other, one end of one side member being longer than the corresponding end of the other side member; flanges formed integrally with and at right angles to each of said side members, one flange for engaging the upper surface of the channel and the other flange for engaging the lower surface of the channel, a bolt seated in the bracket flanges for extending along a side surface of the channel to clamp the bracket in position thereon, and means for mounting an outlet box on either side member in a position spaced from the flanges thereof.

4. An outlet box support as set forth in claim 3 in which at least one flange has a lip formed integrally therewith, said lip adapted to extend along the side of the channel to lock the bracket against transverse movement thereon.

References Cited in the file of this patent

UNITED STATES PATENTS

| | | |
|---|---|---|
| 1,865,134 | Plimpton | June 28, 1932 |
| 2,053,124 | Banks | Sept. 1, 1936 |
| 2,392,932 | MacBeth | Jan. 15, 1946 |
| 2,485,090 | Finch | Oct. 18, 1949 |
| 2,631,809 | Jacobson | Mar. 17, 1953 |
| 2,736,527 | Maier | Feb. 28, 1956 |
| 2,783,014 | Kenney | Feb. 26, 1957 |